Dec. 19, 1933.  H. VAN ROSEN  1,940,195
INSULATOR CAP
Original Filed Sept. 23, 1929
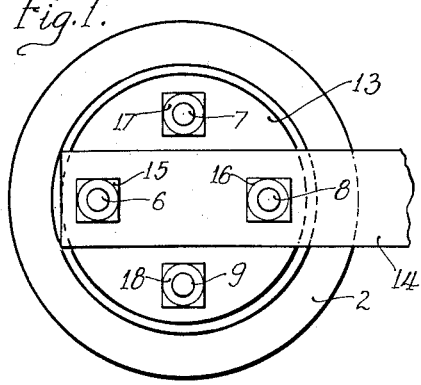
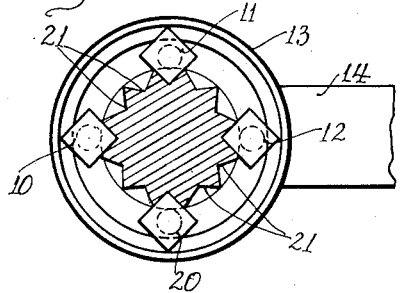
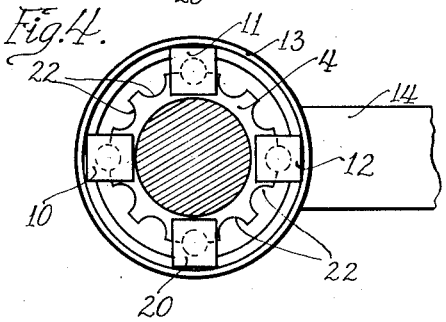
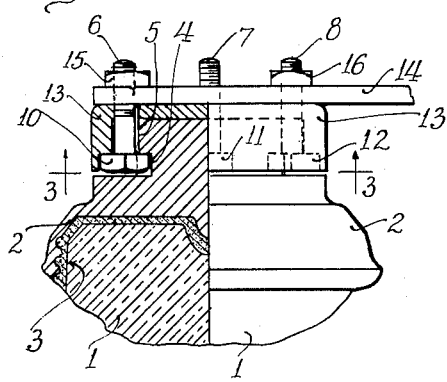
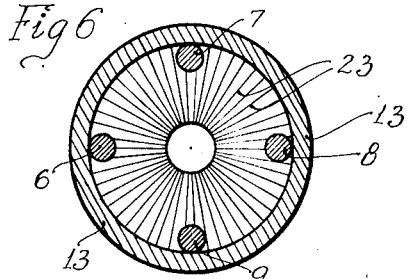
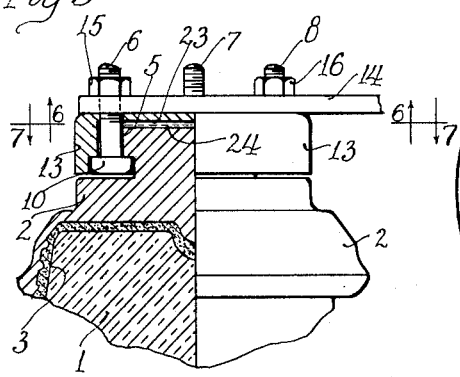
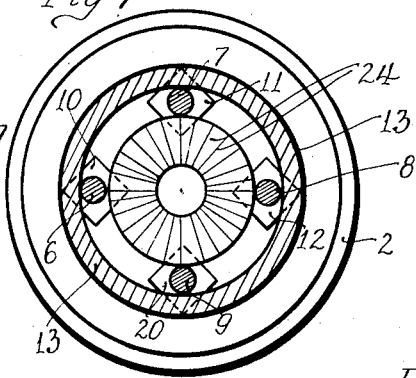
Inventor
Hugo Van Rosen Patented Dec. 19, 1933

1,940,195

UNITED STATES PATENT OFFICE 1,940,195

INSULATOR CAP

Hugo Van Rosen, Chicago, Ill., assignor to Delta-Star Electric Company, Chicago, Ill., a corporation of Illinois Original application September 23, 1929, Serial No. 394,535, now Patent No. 1,877,594, dated September 13, 1932. Divided and this application June 18, 1930. Serial No. 461,909

7 Claims. (Cl. 173—313)

The present application is a division of my copending application, Serial No. 394,535, filed September 23, 1929 and which has resulted in Patent No. 1,877,594, dated Sept. 13, 1932. In this copending application I have disclosed an insulator cap assembly having means for fastening thereto a current conductor which may be a bus bar or the like, in an adjustable and more advantageous manner than was possible in devices of this kind as constructed in the past.

The invention disclosed in the following, being a division of the case noted above, is specifically concerned with an insulator cap assembly having novel means for providing a radially adjustable keyed locking connection between that portion of the cap assembly which is attached to the insulator and the portion to which the current conductor, bus bar, or the like is to be fastened, so that radial displacement between the insulator cap proper and the cooperating supporting member is prevented when these parts are assembled.

Before entering a discussion of my invention, it will be advisable to review the prior art briefly and to point out in a general way the advantages which my invention accomplishes over what is known in the art.

Current conductors provided for certain equipment are usually, in the simplest form, supported on a suitable insulator, which is mounted on a pin and are joined to other conductors by means of a suitable link provided on the insulator. In case of devices, such for example as circuit breakers, transformers, and the like, the conductors terminate in tubular insulators and must be connected exteriorly of these devices to other conductors. The engineer, in either case, is confronted with the problem of devising a suitable supporting link for connecting the conductor disposed within such a tubular insulator or on a pin insulator, with current distributing means, such as a bus bar, which serves the purpose of conductively continuing the conductor from the device in question to other apparatus or equipment where the current is needed.

Such a link must meet numerous requirements. It must be of sturdy construction to withstand strains and stresses; it must be easily attachable, removable and all its parts must be easily accessible; it must be so constructed as to furnish reliability in operation; it must meet the service requirement of both the attached bus bar and of the insulator taking the attachment; and, finally, it must be so constructed as to meet the requirements of economic production, installation and maintenance, including the requirements of safety and dependability. It is necessary, in certain cases, to provide a link which is radially adjustable so that a conductor or a bus bar may be directly joined to the link on the insulator without necessitating bending or twisting to bring the conductor or the bus bar in a certain relation relative to the insulator. It will at once be seen that an engineer attempting to furnish a product which combines all or some of the above enumerated factors harmoniously, will be confronted with difficulties.

Now, let us look how the structures proposed in the past solve the problem.

Early designs showed a suitable split clamp attached to a porcelain insulator and, in certain cases, provided a padding of copper braid to distribute the pressure on the porcelain insulator and to equalize stresses imposed on the structure. A suitable connecting link was provided between the clamp and the current conductor terminating in the insulator, and the bus or other conductor was attached thereto in some convenient manner.

This construction presents obvious objections. In the first place, the structure is somewhat awkward and can be technically realized only within certain limits of sizes, and appliances. It lacks the elements which adapt a technical provision for application in any case, regardless of the size, shape and purpose of the devices which it is intended to serve. In other words, it is not adapted for standardization beyond the limits given by certain appliances of certain sizes and shapes. It presents difficulties in completing the junction between the conductors. The various parts which are assembled to make its structure are subject to corrosion, and, accordingly replacements of parts will be necessary and difficulties will be encountered in the attempt to disassemble the parts. And, finally, the structure is not accurate and is therefore subject to transmitting detrimental strains and stresses to the various parts which it unites, and frequently causes breakage of parts, such as the insulator.

A further step in the advance of making such supporting links, and particularly in cases requiring greater accuracy and greater strength of bond, may be found in constructions which propose to attach a suitable cap to an insulator by cementing or the like, and providing on this cap a suitable number of threaded holes at radially fixed points. In these constructions, the busses or current conductors are attached to the cap by means of suitable screws engaging these threaded holes in the cap and holding the conductor or bus bar either directly or by means of suitable clamps.

This last described construction is frequently objected to because the screws or bolts, and also the threads in the insulator cap corrode and cause difficulties in case of removal or changes which may become necessary. There is, furthermore, the danger of stripping the threads in the cap. It was variously attempted to overcome the difficulties attending the corrosion and rusting of the screws or bolts in the cap, by galvanizing the insulator cap after tapping and then retapping with a smaller tap which does not remove all of the galvanizing from the threads. However, experience proves that this procedure does not yield satisfactory practical results.

It will also be apparent that tapped insulator caps, as discussed in the foregoing paragraph, present other objections. The structure is unwieldy; it is not radially adjustable; it lacks the desirable feature of standardized adaptation to a great variety of inherently similar and related objects and uses; and it is inaccurate and subject to the transmission of thrusts or stresses which might be detrimental to other parts and responsible for breakage.

In an effort to improve the structure and to provide a more reliable and more adaptable link of this character, engineers devised various other constructions. For example, an insulator cap as is shown in the patent to B. W. Kerr, No. 1,590,381 of June 29, 1926. The cap shown in this patent, comprises a shell which is attached to an insulator by cementing. A number of recesses are provided in this cap and a plate is finally secured to the top of the cap having a number of slots in register with the recesses for receiving the shanks of bolts. The heads of these bolts engage the recesses and the bus or conductor structure is attached to the plate on the top of the cap.

Other known constructions deviate from the above by providing fixed transversely recessed cross slots in an insulator cap, whereby the heads of the holding screws are inserted centrally and pushed in place laterally along the slots. It was also suggested to attach a suitable base member to the cap, provided with radially extending fixed slots, or openings, for adding an adjustable feature to the structure.

There are numerous other constructions known to the art. It is believed, however, that the examples given above will suffice for illustrating the development and the state of the art.

Now, the principal aim and purpose of the invention as disclosed in my copending application mentioned previously is to devise an insulator cap which meets all the fundamental requirements that can reasonably be demanded. It consists of a supporting cap member for attachment to an insulator. This cap member is provided with an annularly recessed portion for receiving the heads of bolts or screws projecting with their shanks and threaded ends in axial continuation of the insulator. A generally cup or bell shaped companion supporting member provided with holes in number equal to the number of screws on the cap member is telescoped over the recessed portion of the cap member so that the threaded portions of the screws project from the bottom of the cup shaped support. The structure which is to be attached, such as a bus bar, is fastened to the companion supporting member by means of suitable nuts engaging the threaded bolts. With the bolts loose the companion supporting member may be rotated on the stationary cap member through 360 degrees, the heads of the bolts moving within the annular recess in the cap member. It is thus possible to adjust the movable companion member on the cap according to requirements of a given installation, with the cap member proper firmly attached to the insulator. This was heretofore impossible.

It will be understood that the structure described above lends itself easily to standardization to any size and that it may be used in connection with a great variety of appliances. The cap as such being fixed on the insulator body and the companion supporting member holding the attached structure being movable on the cap, it will be understood that the attachment, in the absence of any radial keying or locking provision, would have to rely on the force of the bolts, uniting the stationary part with the movable part of the assembly. In other words, a structure as described above, would have to rely on friction between the movable and the fixed parts for permanence of attachment radially of the insulator.

It is desirable in certain cases of such insulator cap assemblies, particularly in cases of large and heavy structures in which jolts or thrusts might occur, to provide an adjustable keyed connection between the stationary cap and the movable support.

The present invention is concerned broadly with an adjustable keyed connection between the stationary and the movable supporting members, and particularly with a radially adjustable keyed connection between these parts.

This is accomplished in one embodiment, by providing a plurality of peripheral recesses or notches in the annular groove or recess in the cap member for receiving and for holding the heads of the bolts in the position in which they are placed. The heads of the bolts being thus held in place in predetermined positions on the cap, a radial displacement of the companion support held by the bolts on the cap will be prevented.

In another embodiment the adjustable locking connection is furnished by providing suitable recesses or notches peripherally on the head or flange of the cap member for holding the shanks of the bolts against radial displacement.

In another embodiment, I suggest to provide serrated or recessed planes on the bottom of the cup shaped companion supporting member and on the face of the flange on the cap opposing the bottom of the companion member in assembly.

The principal objects accomplished by the invention are enumerated below as follows:

One object is concerned with providing an insulator cap assembly comprising a stationary cap member attached to an insulator and a movable companion member attachable to the stationary member by means of bolts or screws, and means on the stationary member for selectively locking or keying the bolts and thereby the movable member against radial displacement.

Another object is concerned with providing an insulator cap assembly of the class explained, comprising a stationary and a movable member and bolts axially securing these members in assembly, in which the movable member is selectively locked or keyed against radial displacement in any predetermined position by cooperating means provided on the stationary and on the movable members.

It will be understood, of course, that the invention is not limited and is not intended to be limited in its application to the precise structure and use described in this specification, but that its use is contemplated for securing generally a stationary supporting member and a movable carrier member wherein stresses may occur which make it desirable to secure the members against relative radial displacement substantially as shown and described.

The invention is illustrated in various embodiments in the accompanying drawing, in which Figure 1 shows a top view of the assembly;

Figure 2 represents a side view partly in cross-section;

Figure 3 shows a transversal cross-section taken on line 3—3 of Figure 2;

Figure 4 illustrates a transversal cross-section similar to the cross section shown in Figure 3, but showing another embodiment of the invention;

Figure 5 represents a side view partly in cross-section of a further modification; and Figures 6 and 7 illustrate transversal cross-sections of the assembly taken on lines 6—6 and 7—7 in Figure 5.

For the sake of convenience, similar reference numerals indicate corresponding parts throughout the several views of the drawing.

Referring now particularly to Figures 1 and 2, numeral 1 indicates an insulator of porcelain or the like which may be mounted on a suitable pin. I have shown the insulator only fragmentary and have omitted the mounting pin since the manner of mounting such an insulator is well known. It is, of course, understood that the insulator may also be of tubular shape and suitably mounted on top of an apparatus such as a circuit breaker, or the like. Upon the insulator 1 is mounted a cap 2, by means of cementing or the like, the layer of cement being indicated by numeral 3. The upper part of the cap is annularly recessed as shown in Figure 2, and terminates in a head plate or flange portion 5. A suitable number of screws or bolts 6 to 9, inclusive, is provided, the heads 10, 11, 12 and 20 of these bolts being inserted in the annular groove 4 and the shanks of the bolts projecting upwardly. A substantially cup shaped supporting member 13, provided with holes for the passage of the bolts 6—9 is then telescoped over the head flange 5 of the cap as shown. The bus bar or the like, indicated by numeral 14 is attached to the companion supporting member by means of nuts 15 and 16 engaging the threaded bolts 6 and 8, and nuts 17 and 18 are attached to the bolts 7 and 9. With the nuts loose on the threaded bolts, the bus bar 14 may be adjusted radially into any position relative to the stationary cap 2. The heads of the bolts will move circularly within the annular groove or recess 4 during the adjusting operation. When the bus bar is suitably located, the nuts are tightened and lock the assembly in operating position. It will be seen that the wall of the cup shaped companion supporting member 13 is provided with an annular recess for taking the heads of the bolts and for providing a ledge overlapping the heads of the bolts so that the entire assembly presents a neat appearance.

With the assembly as described, the companion supporting member and any structure attached to it may be radially adjusted relative to the stationary cap member. The fixed position of the companion supporting member and of the structure attached thereto will, therefore, depend on the tightening of the nuts. In order to insure the position of the companion supporting member in a more definite manner, I have provided an adjustable keyed locking connection between the companion supporting member and the stationary cap member, which is shown in two embodiments in the Figures 3 and 4.

Referring particularly to Figure 3, which is a cross-section on line 3—3 of the assembly shown in Figures 1 and 2, it will be seen that a number of notches 21 are provided peripherally inside the annular recess on the stationary cap for selectively taking the heads 10, 11, 12 and 20 of the bolts.

Figure 4 which is a cross section similar to Figure 3 shows a modification in which the flange 4 of the stationary cap is provided with a number of peripherally disposed notches 22 for holding the shanks of the bolts against radial displacement.

It will be apparent that the movable companion supporting member 13 will be locked in place and held against radial displacement on the stationary cap 2, in either of the embodiments discussed above in connection with Figures 3 and 4. In Figure 3, the bolts holding the member 13 will be locked or keyed to the groove 4, and in case of the embodiment in Figure 4, the shanks of the bolts will be keyed to the stationary member. With the bolts keyed against radial motion, the movable member held by these bolts will be keyed likewise and prevented from radial motion on the stationary support.

Figure 5 is a view similar to the view shown in Figure 2, and Figures 6 and 7 are cross-sectional views taken on the lines 6—6 and 7—7, respectively, looking in the direction of the arrows as indicated on Figure 5. The difference between the embodiments shown in the Figures 1, 2 and 3 and the one shown in Figures 5, 6, 7, resides in the keyed locking connection, which is, in the latter modification, provided on the opposing faces of the movable companion member and the flange of the stationary cap. These faces are serrated or roughened as indicated by numerals 23 and 24, respectively, for preventing relative angular motion after the parts are assembled and locked together by means of the bolts.

It will be seen that the notches or irregularities provided on the flanged head of the cap in the various embodiments give this head in effect a polygonal shape. This principle may be extended by shaping the flange to form a square, hexagon or other suitable polygon. The movable companion member may likewise be shaped to correspond circumferentially to the shape of the flanged head of the stationary cap member so that relative radial displacement is prevented when the two parts are axially assembled.

Other modifications may suggest themselves and may obviously be carried out within the limits and within the spirit of the invention. I therefore want to have it understood that I intend to apply the invention subject only to the scope and meaning of the claims which follow.

I claim:

1. A support for current conductors including an insulator, comprising a first supporting member attached substantially stationary to said insulator, an enlargement on said first supporting member, a substantially cup shaped companion supporting member for adjustable inverted attachment to said first supporting member and covering said enlargement, means on said enlargement for selectively determining the radial adjustment of said members relative to each other, and means cooperating with said enlargement and with said companion member for axially joining said members to secure said radial adjustment.

2. A support including a substantially stationary member, a first supporting member attached to said stationary member, a flange enlargement on said first supporting member, a substantially cup shaped companion supporting member for adjustable attachment to said first supporting member and covering said flange enlargement thereon, means on said enlargement cooperating with said companion member for selectively determining the radial adjustment of said members relative to each other thru 360 degrees and means disposed within said companion supporting member and cooperating with said flange enlargement and with said companion member for axially joining said members to secure said radial adjustment in any predetermined position.

3. An insulator cap assembly, comprising a supporting cap for substantially stationary attachment to an insulator, said cap having an axially extending radially recessed portion, a substantially cup shaped companion support for adjustable attachment to said recessed portion and covering the same, a plurality of bolts disposed within said companion support and engaging said recessed portion, the shanks of said bolts projecting from said companion support for securing said cap and said support in axial assembly, locking notches on said recessed portion within said companion support for receiving said bolts and securing said support in any predetermined radial relation relative to said cap.

4. An insulator cap assembly, comprising a supporting cap for substantially stationary attachment to an insulator, said cap having an axially extending radially recessed portion, a substantially cup shaped companion support for adjustable attachment to said recessed portion and covering the same, a plurality of bolts disposed within said companion support and engaging said recessed portion, the shanks of said bolts projecting from said companion support for securing said cap and said support in axial assembly, and cooperating means on said recessed portion within said companion support for securing said support against radial displacement on said cap in any predetermined radial position relative to said cap.

5. An insulator cap assembly, comprising a supporting cap for substantially stationary attachment to an insulator, said cap having an axially extending radially recessed portion, a substantially cup shaped companion support for adjustable attachment to said recessed portion and covering the same, a plurality of bolts disposed within said companion support and engaging said recessed portion, the shanks of said bolts projecting from said companion support for securing said cap and said support in axial assembly, and cooperating serrations on said recessed portion and within said companion support for holding said support against radial displacement on the cap in any predetermined radial position relative thereto.

6. An insulator cap having a recessed extension, bolts lying along the outside of the extension with their heads in the recess, a cylindrical member separate from the cap and surrounding the extension and the bolts, and notches formed in said extension for holding said bolts against movement along the periphery thereof.

7. In combination, a support comprising an insulator, an enlargement on the end of the insulator, a member adapted to be held, fasteners joining said member and said enlargement, said fasteners being shiftable along the periphery of the enlargement, means for fixing the peripheral shifting of said fasteners to fixed increments, said fasteners being held against movement axially of the enlargement when positioned in their position closest to the axis of the enlargement, and means held in position by said fasteners and holding the fasteners against movement radially outward of the enlargement.

HUGO VAN ROSEN.